May 24, 1960  C. J. TODDY  2,937,406
FLUID PRESSURE CORE
Filed March 20, 1959

INVENTOR.
CLAYTON J. TODDY
BY
J. B. Holden
ATTORNEY

United States Patent Office 2,937,406
Patented May 24, 1960

2,937,406

FLUID PRESSURE CORE

Clayton J. Toddy, Akron, Ohio, assignor to The Goodyear Tire & Rubber Company, Akron, Ohio, a corporation of Ohio Filed Mar. 20, 1959, Ser. No. 800,732

11 Claims. (Cl. 18—45)

This invention relates to a fluid pressure core for use within hollow articles to be vulcanized or heated within a mold. More particularly, the invention relates to fluid pressure cores, such as full circle or sectional airbags, bladders, and the like which are insertable within tires and like articles during vulcanization to force the external surface of the article into engagement with a mold and to exert pressure thereon.

One object of this invention is to provide an improved fluid pressure core having a permanently and continuously lubricated surface for reducing the friction between the airbag and the internal surface of the tire to thereby materially increase the life of the core. This is accomplished by means of a layer of rubber or rubberlike material having a lubricant physically embedded in the rubber or rubberlike material which is integrally formed on the surface of the core.

Another object of the invention is to provide a fluid pressure core of a character described in which the external surface covering of the core is provided with a rubberlike material having a solid or liquid lubricant, either singly or in combination, physically mixed therein and with the said covering being applied to those surfaces of the core which are subject to the most abrasive action during the assembly and inflation of the core within the tire.

Other objects of this invention will appear hereinafter as the description of the invention proceeds. In the drawings.

Figure 1:
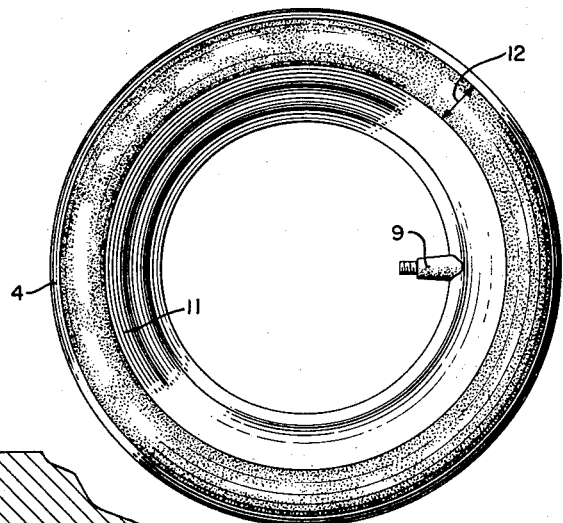
Fig. 1 is a side elevational view of a curing or air bag employing this invention.
Figure 2:
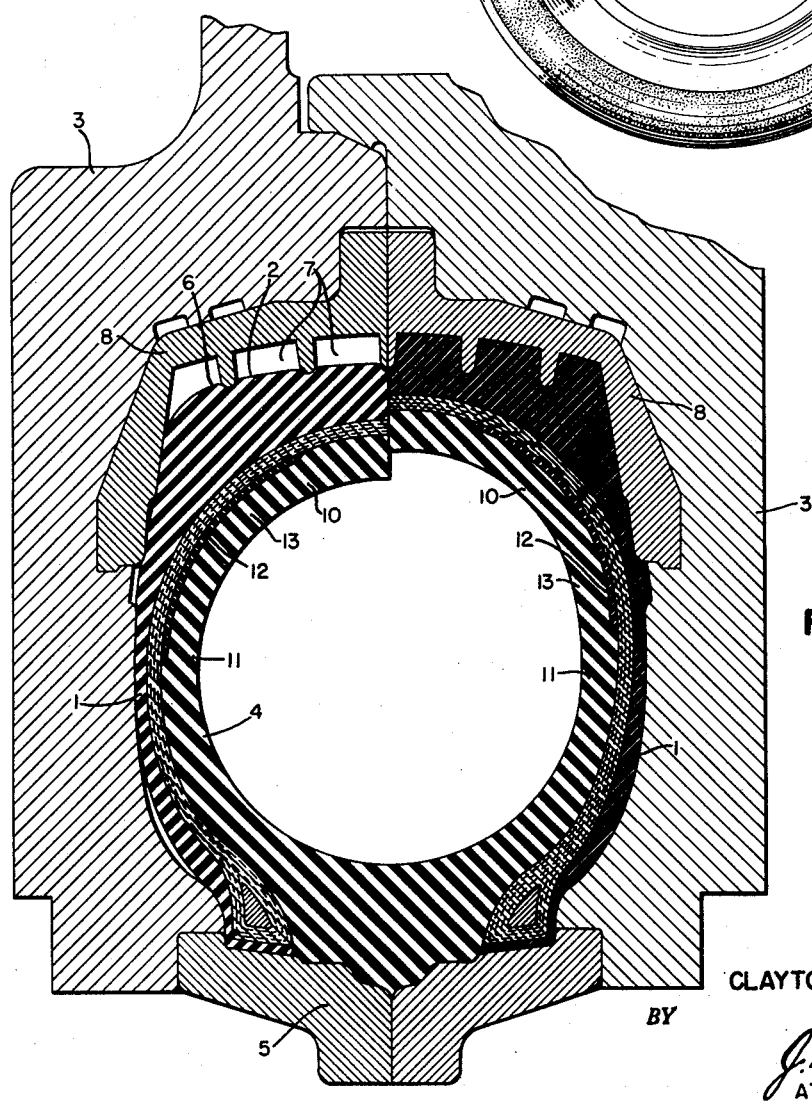
Fig. 2 is a cross sectional view of a mold tire and airbag assembly.

In curing new tires or retreading old tires, the tire carcass 1, as shown in Fig. 2 of the drawings, having an uncured tread portion 2 is positioned within a curing mold 3 and with a curing bag 4 positioned within the tire as an aid in shaping the tire, and also for the purpose of applying internal heat and pressure to the tire 1 during vulcanization. As shown in the left hand side of Fig. 2 of the drawings, prior to inflation, the curing bag 4 and the tire 1 are positioned within the mold 3 with a rather loose fit and it is the purpose and function of the curing bag 4 upon inflation to move radially outwardly with respect to the base 5 of the mold and force the external or tread surface 6 of the tire into the grooves 7 of the tread matrix 8. The airbag 4 is inflated with a fluid under pressure through the valve stem 9 and the tire 1 and bag 4 expand into a position shown on the right side of Fig. 4 of the drawings. It is apparent that during movement of the bag and tire from the deflated to inflated positions as shown in Fig. 2 the external surface of the bag 4 and the internal surface of the tire 1 must move relative to each other and that considerable frictional forces are produced during such movement.

Prior to this invention it has been the experience of those skilled in the art that higher frictional forces are developed between the external surface of the bag and internal surface of the tire at certain locations, particularly beneath the shoulder areas of the tire so that the portion of the airbag 10 located generally beneath the tread of a tire was not permitted to readily slide relative to the tire so that during expansion of the bag 4 the sidewall area 11 of the bag was placed under considerable tension radially thereof and in some cases was actually reduced in gauge. Repeated use of the bag caused substantial reduction in gauge in the area 11 and eventual premature failure of the bag.

In accordance with this invention, the bag 4 is provided with a thin layer 12 at the external surface thereof and preferably in the shoulder areas 13 of the bag. Layers 12 are made of an especially compounded lubricated rubber which substantially eliminates abrasive action between the external surface of the bag and the internal surface of the tire and in fact lubricates the surfaces so that during inflation of the bag 4 the contour of the bag 4 radially adjusts itself to the expanded contour of the inner surface of the tire even after repeated re-use of the bag.

The thickness of the rubber layers 12 need preferably be only about .06 inch and the layers 12 are applied to the curing tube 4 during the building operation thereof and while the layers 12 and the tube 4 are in the unvulcanized condition. The layers 12 may be made by calendering thin sheets of rubber which are then cut to suitable size and applied in the shoulder areas 13 of the uncured tube. During vulcanization of the tube 4 the layers 12 are vulcanized directly to the tube 4 and the edges thereof are tapered off somewhat due primarily to flow of the rubber during the molding operation.

Whatever the location of the lubricated rubber layers 12 the primary purpose of the lubricated rubber is the same, namely, to permit the tube 4 to readily adjust to the contour of the inflated tire 1 and although it is preferable to apply the layers 12 at those areas in which the frictional resistance is greatest, it may be desirable to apply the lubricated rubber layers at other portions of the surfaces of the tube 4 and/or over the entire outer surface of the tube 4.

The amount of lubricant to be employed in the lubricated rubber will be determined by the nature of the lubricant and the amount that the rubber may hold physically without destroying the usefulness of the physical structure of the rubber to hold the lubricant in place or reduce its useful tackiness in the uncured state. Thus, if one were to use an extremely high percentage of graphite, say 95%, and mix it with 5% of rubber, the material would probably not hold together very well. It has been found that by using a solid lubricant such as graphite, amounts up to 40% by weight can be used successfully with the balance being rubber, or if a liquid lubricant is used it has been found that an amount as high as 8% by weight may be used successfully. If a combination of a solid and a liquid lubricant is used, then these percentages may have to be reduced to some extent. The critical point involved here is the ability of the rubber to hold the desired amounts of the lubricant. There must be sufficient rubber to bond the materials together and hold them together during the building of the core or bag and after vulcanization thereof. It should also be understood in this connection that the amount of lubricant used should not be great enough to materially destroy the tackiness of the rubber as it is preferable that the rubber surface remain tacky to permit easy application to the core or bag prior to vulcanization, so as to eliminate the need of cements and the like during the building operation.

The particular nature of the solid and liquid lubricants is very important for the purposes of this invention. The solid lubricants should preferably be those which have relatively flat cleavage planes such as graphite, mica and molybdenum-disulphide. Such lubricants are desirable because after being mixed with the rubber, the flat surfaces are more or less arranged parallel to the surface of the rubber during the calendering, tubing and molding operation because of the pressure exerted on the rubber during these operations. The flat surfaces are, therefore, in proper position to give maximum lubrication. Graphite is relatively cheap, is available in large quantities for this purpose and has been selected as a preferable solid lubricant. While graphite is a carbon compound similar to the carbon that is used in the rubber itself, its physical structure is different because it has flat cleavage planes, whereas ordinary carbon is amorphous and in itself is not a good lubricant.

The liquid lubricant should not be compatible with rubber and of a type not readily dissolved into the physical structure of the rubber. It should also be a stable compound which will not break down during normal or emergency operating conditions. Some of the following are suggested as suitable liquid lubricants for use with a rubbery material for the purposes of this invention: glycerine, castor oil, olive oil, transformer oil, and similar non-drying triolein oils or a chlorinated bi-phenyl such as the Arochlors made by Monsanto Chemical Co.

These liquid lubricants are heat stable and, therefore, do not break down readily into other compounds having little if any lubricating qualities.

Since heat resistance and abrasion resistance are possessed, to a greater or less degree, by all types of rubber both natural and synthetic, it is possible to use in the lubricating layers 12 natural rubber, synthetic natural rubber, reclaimed rubber, the rubbery copolymers of butadiene and styrene, known as GR–S, the oil-extended copolymers of butadiene and styrene, the rubbery copolymers of butadiene and acrylonitrile, known as GR–A, the rubbery polymers and copolymers of 2-chlorobutadiene-1,3, known as neoprene, or the rubbery copolymers of a major proportion of an iso-olefin such as isobutylene and a minor proportion of a conjugated di-olefin such as butadiene-1,3, these copolymers being known as butyl rubber. It may be desirable to use blends of two or more of these rubbers which are adhesively and physically compatible with one another to get optimum heat and abrasion resistance. Butyl rubber is one of the more preferred types of rubber for use in fabricating the lubricating layer although since its adhesion to other rubbers such as natural rubber and GR–S is not adequate unless an adhesive is used, butyl rubber should preferably be used only when butyl rubber is also used in the other rubber portions of the core or bag as otherwise there may be adhesion problems.

Two rubbers which give excellent results are natural rubber and GR–S. It has been observed that optimum results are obtained by using mixtures of GR–S with natural rubber in the range of from 25 parts to 40 parts of GR–S by weight with from 75 to 60 parts natural rubber by weight. These blends have been observed to provide very satisfactory operating results, since they are not subject to the tendency of an all-GR–S compound to become brittle, nor to the observed tendency of an all-natural rubber compound to become sticky under extended operating conditions.

An example of a specific formulation which has proven to be particularly effective in producing the desired functional characteristics in the lubricating layer is shown below. Parts are shown by weight.

| | Parts |
|---|---|
| Natural rubber | 70 |
| GR–S (75/25 copolymer of butadiene/styrene) | 30 |
| Graphite | 60 |
| Castor oil | 10 |
| Paraffin wax | 2 |
| Anti-oxidant (polymerized tri-methyl dihydroquinone) | 2 |
| Mercaptobenzothiazyl disulfide | 1 |
| Mercaptobenzothiazole | 1 |
| Sulfur | 0.75 |

The amount and types of waxes, antioxidants, accelerators, and curing agents employed in the compounding of the lubricating strips may be varied from the amounts indicated in the formulation given above, depending upon the particular rubber employed and the service conditions to which the lubricating layer will be exposed. While in the above formula the specific synthetic rubber employed is a 75/25 copolymer of butadiene and styrene, it should be understood that other rubbery copolymers containing, for instance, as little as 10% or as much as 40% styrene by weight may be employed.

In regard to the amount of lubricant, whether solid, liquid or mixtures thereof, it should be evident that the exact amount employed will depend upon the amount of lubrication desired and the particular rubber with which the lubricants are to be used, it being desirable that only sufficient lubricant be present to provide the desired lubricating surface on the rubber employed, without reducing the tackiness beyond a point such that it will not adhere satisfactorily to other elements of the core or bag.

While certain representative embodiments and details have been shown for the purpose of illustrating the invention, it will be apparent to those skilled in the art that various changes and modifications may be made therein without departing from the spirit or scope of the invention.

I claim:

1. A fluid pressure core for use within hollow articles to exert pressure against the internal surface of the article to force the external surface of the article into engagement with an external mold under pressure comprising, an inflatable body having a surface formed of a rubber compound which covers at least a portion of the surface of said body, said compound being made of rubber having physically contained therein a lubricant to provide a continuously renewable lubricated surface.

2. A fluid pressure core as claimed in claim 1 in which said lubricant is a liquid which is incompatible with the rubber of said layer and exudes to the surface of said layer during use of the core to provide a continuously renewable lubricated surface.

3. A fluid pressure core as claimed in claim 2 in which said lubricant is chlorinated biphenyl.

4. A fluid pressure core as claimed in claim 2 in which said lubricant is non-drying triolein oils.

5. A fluid pressure core as set forth in claim 2 in which the lubricant is glycerine.

6. A fluid pressure core as claimed in claim 2 in which the lubricant is castor oil.

7. A fluid pressure core as claimed in claim 2 in which the lubricant is transformer oil.

8. A fluid pressure core as claimed in claim 1 in which the lubricant includes a solid lubricant.

9. A fluid pressure core as claimed in claim 1 in which the lubricant is a solid crystalline substance having flat cleavage planes.

10. A fluid pressure core as claimed in claim 1 in which said body is elongated and longitudinally arcuate in shape and adapted to be inserted within a tire to be vulcanized, said compound of lubricated rubber being located only at selected circumferential extending areas of the external surface of the core which contact the inner tread surface of the tire.

11. A fluid pressure core as claimed in claim 2 in which said body is elongated and longitudinally arcuate in shape and adapted to be inserted within a tire to be vulcanized, said lubricated rubber compound being arranged in two-space circumferentially extending areas, one at each of the lateral edges of the core which contact the inner shoulder portion of the tire.

References Cited in the file of this patent

UNITED STATES PATENTS

| 1,435,970 | Merrill | Nov. 21, 1922 |
| 1,699,600 | Mann | Jan. 22, 1929 |
| 2,403,476 | Berry et al. | July 9, 1946 |

FOREIGN PATENTS

| 785,733 | Great Britain | Nov. 6, 1957 |